D. J. ARPIN.
SCRAPER.
APPLICATION FILED APR. 1, 1910.
969,764.
Patented Sept. 13, 1910.
2 SHEETS—SHEET 1.
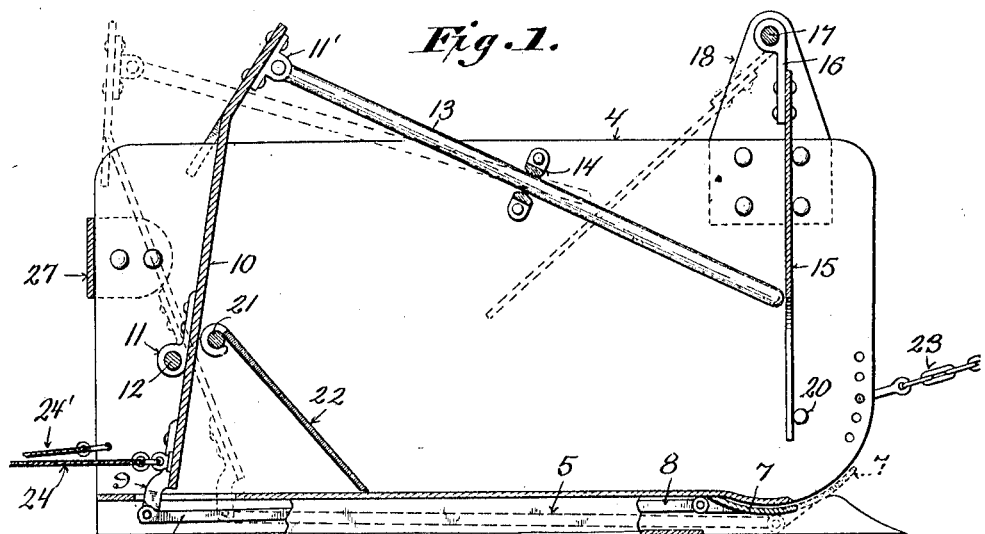
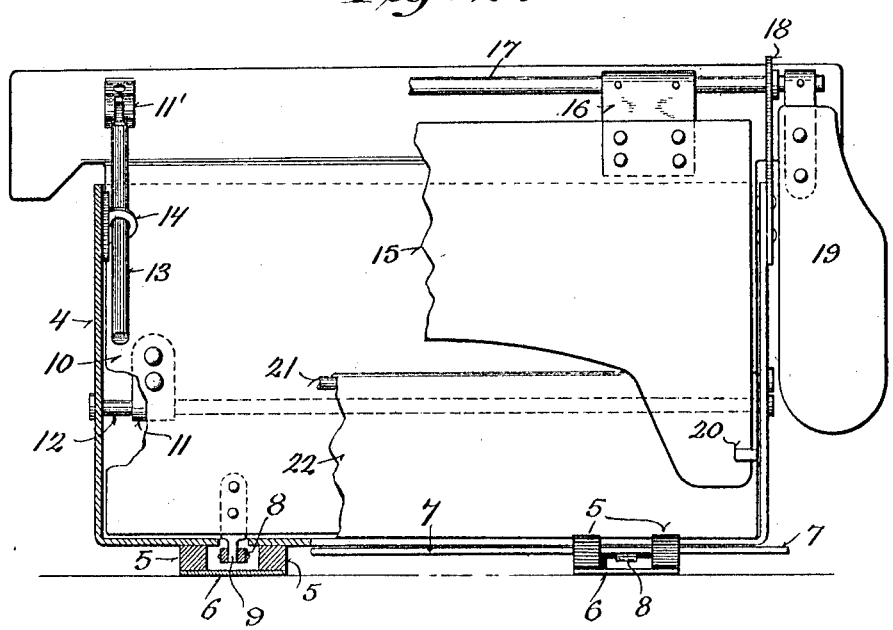

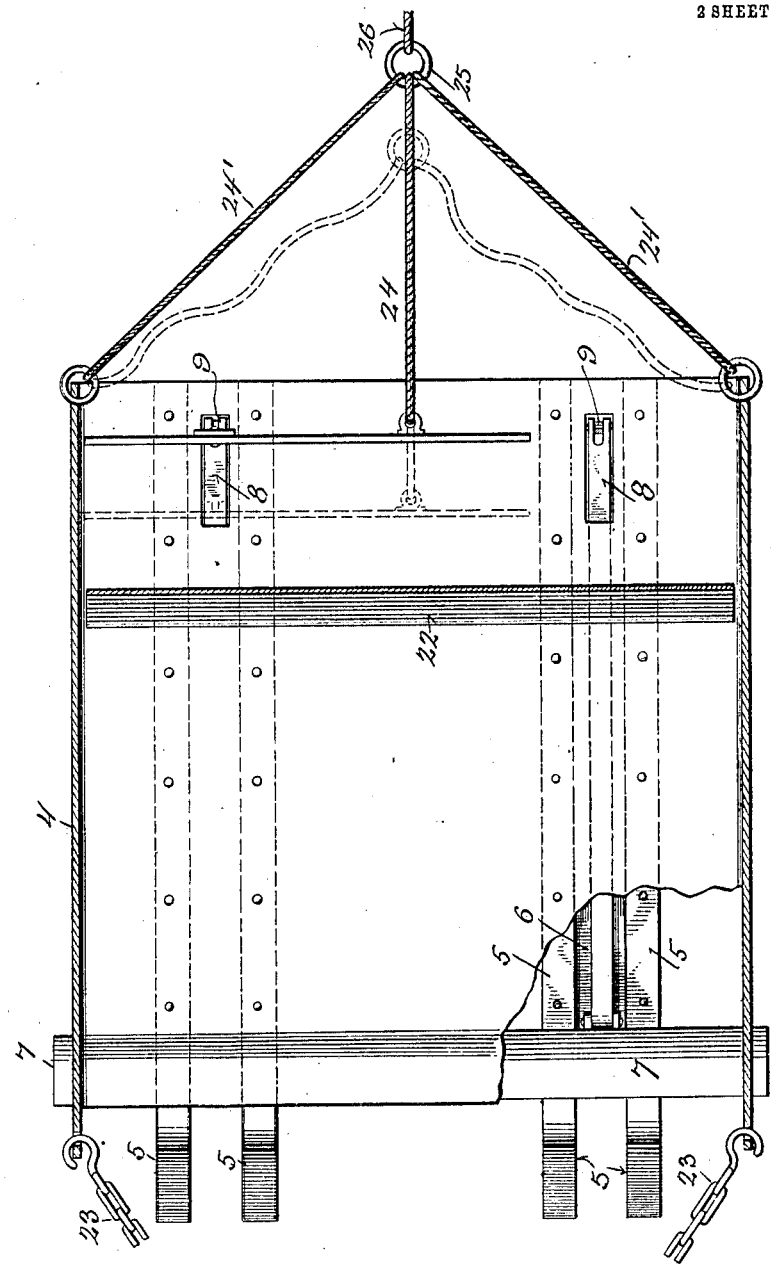

UNITED STATES PATENT OFFICE.

DANIEL J. ARPIN, OF GRAND RAPIDS, WISCONSIN.

SCRAPER.

969,764.  Specification of Letters Patent.  Patented Sept. 13, 1910.

Application filed April 1, 1910. Serial No. 552,882.

*To all whom it may concern:*

Be it known that I, DANIEL J. ARPIN, a citizen of the United States, and resident of Grand Rapids, in the county of Wood and State of Wisconsin, have invented certain new and useful Improvements in Scrapers; and I do hereby declare that the following is a full, clear, and exact description thereof.

My invention consists in what is herein particularly set forth with reference to the accompanying drawings and pointed out in the claims of this specification its object being to provide simple, economical distant power scrapers designed to automatically disengage from the earth ahead of same when loaded and to likewise dump their loads.

Figure 1 of the drawings represents a vertical longitudinal section of a scraper in accordance with my invention; Fig. 2, a front elevation of the same partly broken away, and Fig. 3, a horizontal section view of said scraper having parts thereof broken away.

Referring by letter to the drawings, 4 indicates the scoop of my improved scraper provided with hollow runners each comprising a pair of parallel bars 5 on the underside of the flat bottom of said scoop and a plate 6 riveted or otherwise rigidly secured to the bars. The forward ends of the runner-bars project beyond the bottom of the scoop and are beveled, as best shown in Fig. 1, to readily plow into the earth to be excavated, and said bars are also suitably recessed forward of the plates 6 to serve as guides for an adjustable fender 7 that is connected by link-rods 8 with brackets 9 of a pivoted back 10 of said scoop, the link-rods being for the most part within the runners aforesaid and said brackets movable in play-slots with which the bottom of the scoop is provided.

The back 10 is herein shown provided with eye-brackets 11 loose on a pivot-rod 12 secured in connection with the sides of the scoop. The pivotal back extends above the sides of the scoop and this upper portion of said back is preferably at an angle to the remainder of the same. It is also preferred to extend the upper portion of the back beyond the sides of the scoop. In pivotal connection with brackets 11′ or otherwise suitably connected to the pivotal back of the scoop are rods 13 for which the sides of said scoop are provided with guide-eyes 14, and the free ends of these rods oppose a gate 15 pivotally suspended in the forward portion of the aforesaid scoop. As a matter of detail, the gate is herein shown provided with hangers 16, secured to a pivot-rod 17 supported in brackets 18 riveted or otherwise suitably fastened to the sides of the scoop to extend above the same.

The lower contour of the gate is such as to provide a throat for the entrance of dirt to the scoop and it is preferable to rigidly secure a wing 19 on each outwardly extending end of the rod 17 from which said gate is suspended. To limit outward swing of the gate, a stop 20 is employed in connection with a side of the scoop.

Crossing the scoop, forward of the pivotal back of same, is a rod 21, and pivotally hung on this rod is an inclined plate 22 that normally rests upon the bottom of said scoop and serves to guide the incoming dirt upward against that portion of the back 10 above the pivot-rod 12.

Draft-chains 23 are shown in hook-connection with eyes provided in the sides of the scoop, there being a series of eyes in each of said sides to provide for regulating the depth of draw of said scoop into the earth to be excavated.

Suitably secured in connection with the sides of the scoop and its pivotal back are cables 24 joined by a ring 25 to a drag-cable 26. In practice the draft-chains 23 are coupled to one another and a single chain or cable (not shown) that is in turn connected to a conveniently located power-drum, and the cable 26 is also connected to such a drum. A rear upper cross-brace 27 is shown in connection with the sides of the scoop.

Assuming the movable parts of the scraper to be in their normal positions as shown by full lines in Fig. 1, and said scraper put into operation, the pressure of the load of dirt caught in the scoop 4 will be exerted on the pivotal back 10 of said scoop above the pivot-rod 12, and if this pressure is insufficient to rock said back, pressure coming upon the gate 15 and the wings 19 will serve to effect the desired result. The back of the scoop is thus caused to serve as a lever and, through the medium of the link-rods 8, the leverage is exerted to move the fender 7 outward and upward, thus causing the scraper to automatically lift out of the earth ahead of same, the disposition of the movable parts of said scraper out of their normal positions being clearly shown by dotted lines in Fig. 1. During the operation above described and while the scraper is on the way to the place of dump, there is slack of the cables 24 and 26, that are subsequently actuated to effect a retraction of the fender 7 to normal position, a dumping tilt of said scraper and a drag of the same back to the place of loading. When the scraper is dumped, the plate 22 in the scoop swings away from the bottom of said scoop to permit the escape of any dirt that may have fallen in back of said plate.

While I have shown and described a simple, practical application of my invention having especial reference to automatic disengagement of a loaded scraper from the earth ahead of same, the details of said invention may be indefinitely varied with respect to effecting the necessary adjustments of the slidable fender coupled to the pivotal back of the scoop that constitutes a lever movable in one direction under load-pressure in said scoop.

I claim:

1. A scraper having the scoop thereof provided with a slidable lower front fender and a pivotal back coupled to the fender for which it constitutes a lever movable from normal position under load-pressure in said scoop to throw said fender into working position.

2. A scraper having the scoop thereof provided with a slidable lower front fender and a pivotal back coupled to the fender for which it constitutes a lever movable from normal position under load-pressure in said scoop to throw said fender into working position, and means in connection with said back for returning the same and said fender to their normal position preliminary to a dumping operation of the scraper.

3. A scraper having the scoop thereof provided with a slidable lower front fender, a pivotal back coupled to the fender for which it constitutes a lever normally opposed to load-pressure in said scoop, and a pivotal inclined plate forward of the back.

4. A scraper having the scoop thereof provided with a slidable lower front fender, a pivotal back coupled to the fender for which it constitutes a lever normally opposed to load-pressure in said scoop, forwardly extending rods in connection with said back, suitably arranged guides for the rods, and a gate arranged in opposition to the free ends of the rods.

5. A scraper having the scoop thereof provided with a slidable lower front fender, a pivotal back coupled to the fender for which it constitutes a lever normally opposed to load-pressure in said scoop, forwardly extending rods in connection with said back, suitably arranged guides for the rods, a pivot-rod, a gate rigidly secured to the pivot-rod in opposition to the rods aforesaid, and wings in rigid connection with said pivot-rod outside of the aforesaid scoop.

6. A scraper having the scoop thereof provided with a slidable lower front fender, a pivotal back coupled to the fender for which it constitutes a lever normally opposed to load-pressure in said scoop, forwardly extending rods in connection with said back, suitably arranged guides for the rods, and a pivotally suspended device arranged in opposition to the free end of each of said rods.

7. A scraper having the scoop thereof provided with forwardly pointed and recessed underside runner bars, a fender loose in the recesses of the bars, and a pivotal back in link-connection with the fender for which it constitutes a lever opposed to load-pressure in said scoop.

8. A scraper having the scoop thereof provided with a slidable lower fender, a pivotal back coupled to the fender for which it constitutes a lever movable from normal position under load-pressure in said scoop to throw said fender into working position, and a reversing pull device in connection with said back and scoop.

In testimony that I claim the foregoing I have hereunto set my hand at Grand Rapids in the county of Wood and State of Wisconsin in the presence of two witnesses.

DANIEL J. ARPIN.

Witnesses:
  MARGARET STEREHI,
  L. P. ZAHRODKA.